United States Patent [19]
Nickerson

[11] Patent Number: 5,926,569
[45] Date of Patent: *Jul. 20, 1999

[54] BITRATE DAMPER FOR SELECTING QUANTIZATION LEVELS FOR IMAGE ENCODING

[75] Inventor: Brian R. Nickerson, Aloha, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/535,523

[22] Filed: Sep. 28, 1995

[51] Int. Cl.$^6$ ............................. G06K 9/36; H04N 7/12
[52] U.S. Cl. ................. 382/232; 382/251; 382/239; 348/415; 348/405; 348/419
[58] Field of Search ................. 382/239, 251, 382/232; 348/405, 409, 419, 27, 420, 384, 415; 375/245

[56] References Cited

U.S. PATENT DOCUMENTS

| | | | |
|---|---|---|---|
| 4,893,123 | 1/1990 | Boisson | 348/419 |
| 4,933,761 | 6/1990 | Murakami et al. | 348/422 |
| 5,046,071 | 9/1991 | Tanoi | 348/415 |
| 5,097,330 | 3/1992 | Guichard et al. | 348/399 |
| 5,122,877 | 6/1992 | Keesman | 348/420 |
| 5,134,476 | 7/1992 | Aravind et al. | 348/415 |
| 5,150,209 | 9/1992 | Baker et al. | 348/408 |
| 5,214,507 | 5/1993 | Aravind et al. | 348/390 |
| 5,317,397 | 5/1994 | Odaka et al. | 382/232 |
| 5,333,012 | 7/1994 | Singhal et al. | 348/405 |
| 5,351,085 | 9/1994 | Coelho | 348/391 |
| 5,367,629 | 11/1994 | Chu et al. | 382/251 |
| 5,481,309 | 1/1996 | Juri et al. | 348/405 |
| 5,543,844 | 8/1996 | Mita et al. | 348/405 |

OTHER PUBLICATIONS

Kronander, "Post– and Pre–Processing in Coding of Image Sequences Using Filters with Motion Compensated History" 1988 Int. Conf. Acoustics, Speech. Sig. Processing, vol. 2, Apr. 1988, pp. 1104–1107.

*Primary Examiner*—David K. Moore
*Assistant Examiner*—Wenpeng Chen
*Attorney, Agent, or Firm*—William H. Murray; N. Stephan Kinsella

[57] ABSTRACT

For each image, an initial set of quantization (Q) levels is selected based on the pixel data. The pixel data are transformed to blocks of transform coefficients. The initial set of Q levels is incremented and decremented. The incremented Q levels are used to generate a low estimate of bitrate for the transform coefficients and the decremented Q levels are used to generate a high estimate of bitrate for the transform coefficients. The low and high bitrate estimates are compared to a specified target bitrate to generate Q-level adjustments. The Q-level adjustments are used to select the Q levels to encode fully the quantized coefficients of the current image in the sequence of images.

22 Claims, 9 Drawing Sheets

FIG. 1. ENCODING SYSTEM

FIG. 3. BITRATE DAMPER

FIG. 4. BITRATE DAMPING

FIG. 5. BITRATE ESTIMATOR

FIG. 6. BITRATE ESTIMATION

BITRATE DAMPER FOR SELECTING QUANTIZATION LEVELS FOR IMAGE ENCODING

BACKGROUND OF THE INVENTION

1. Field of the Invention

The present invention relates to image processing, and, in particular, to video compression algorithms that involve quantization.

2. Description of the Related Art

In some block transform-based video encoding schemes, each component plane of each video frame is divided into (8×8) blocks. A block transform such as a discrete cosine transform (DCT) or slant transform is then applied either to the pixels of each block or to interframe pixel differences corresponding to each block. The resulting transform coefficients are then quantized for run-length encoding of the quantized coefficients followed by variable-length encoding of the run-length codes.

The quantization of the transform coefficients may be based on the selection of one or more quantization (Q) levels from a set of possible Q levels. Each Q level is associated with a Q table, an array of divisors that are used to quantize the transform coefficients. A fine (i.e., low) Q level is associated with a Q table having small divisors, while a coarse (i.e., high) Q level is associated with a Q table having relatively large divisors.

The selection of Q level typically has the opposite affect on two important goals of video compression: bitrate and video quality. In many video compression applications, it is desirable to have as low a bitrate as possible and as high a video quality as possible. Lower Q levels preserve more detail in the encoded video resulting in higher video quality, but at the cost of higher bitrates. Higher Q levels quantize the video more severely providing lower bitrates, but at reduced image quality.

In some video compression applications, there are transmission bandwidth limitations that require the encoded video bitstream to meet specific target bitrates. If the selected Q level is too low, the encoded video bitstream will exceed the target bitrate. Selecting a high Q level will ensure that the target bitrate is met, but if the Q level is too high, the target bitrate will be undershot resulting in lower video quality than if the encoded video bitstream were roughly equal to the target bitrate.

One way to achieve optimal bitrate is to make an initial best guess of Q level for the current frame and fully encode the frame at that Q level. If the resulting encoded frame size is too big, then a higher Q level is selected and the encoding process is repeated. If the resulting encoded frame size is too low, then a lower Q level is selected and again the encoding process is repeated. The iterative selection and encoding process is repeated until the target bitrate is met with as low a Q level as possible.

Unfortunately, this iterative, brute-force approach is computationally expensive and may be impractical for some applications, for example, in video conferencing in which video frames must be captured, encoded, and transmitted in real time to one or more remote conference participants.

Alternatively, "open-loop" methods of selecting Q level exist which are more practical for real-time video encoding. One approach is to base the selection of Q level on a measure of the energy of the current frame. For example, a mean-square-error (MSE) or sum-of-absolute-differences (SAD) measure can be generated for each block of inputs to the block transform. This measure can then be compared to a model that predicts the bitrate associated with the statistical measure for each of the different Q levels. The model may be generated empirically off line using video sequences similar to those expected during real-time processing.

Such open-loop methods can be successfully used to attain an average bitrate equal to the target bitrate. Unfortunately, the statistical measures of the energy of the pixel data are not consistently good predictors of the size of the encoded frame. As a result, attaining the target bitrate "on the average" means that the target bitrate is exceeded either often by a little bit or infrequently by a lot. In either case, the quality of the decoded video is degraded. When the target bitrate is exceeded in one frame, it must be undershot in the following frame or frames to make up for the excess number of bits. This is achieved by raising the Q level for the subsequent frames, resulting in reduced image quality in those frames and uneven image quality in the overall video sequence as the Q level oscillates from frame to frame. Setting a target bitrate lower than the available transmission bandwidth helps reduce the number of times that the "true" bitrate limit is exceeded, but at the cost of lower overall video quality.

What is needed is a process for selecting quantization levels for encoding video sequences in real time that more accurately and more consistently achieves the target bitrate to provide an optimal balance between the conflicting goals of low bitrate and high video quality.

It is accordingly an object of this invention to overcome the disadvantages and drawbacks of the known art and to provide an approach to the selection of quantization levels that more accurately and more consistently achieves a specified target bitrate.

Further objects and advantages of this invention will become apparent from the detailed description of a preferred embodiment which follows.

SUMMARY OF THE INVENTION

The present invention comprises a computer-implemented process, apparatus, and storage medium encoded with machine-readable computer program code for encoding images. According to a preferred embodiment, image signals corresponding to a current image are transformed to generate transform coefficients for the image signals. A first set of one or more quantization (Q) levels is selected for the current image and a first estimated bitrate for encoding the transform coefficients using the first set of Q levels is generated. A second set of one or more Q levels is selected for the current image and a second estimated bitrate for encoding the transform coefficients using the second set of Q levels is generated. One or more Q-level adjustments are generated from the first estimated bitrate, the second estimated bitrate, and a target bitrate and transform coefficients are encoded based on the Q-level adjustments.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

The present invention is directed to the selection of quantization (Q) levels for encoding image signals. In a preferred embodiment, initial estimates of the Q levels to be used to encode video frames are generated based on the pixel data for the frames. For each frame, a bitrate damper of the present invention generates Q-level adjustments that are used to adjust the Q levels for the current frame in the video sequence. The frames are encoded using the Q-level adjustments generated by the bitrate damper. The heart of the bitrate damper is a bitrate estimator that estimates the number of bits required to encode the frame data without performing the actual encoding process. By generating an accurate estimate of the number of bits to encode, the bitrate estimator provides the bitrate damper with the ability to generate Q-level adjustments that enables the video encoding process to achieve the target bitrate accurately and consistently without performing the actual encoding process more than once.

System Hardware Architectures

Figure 1:
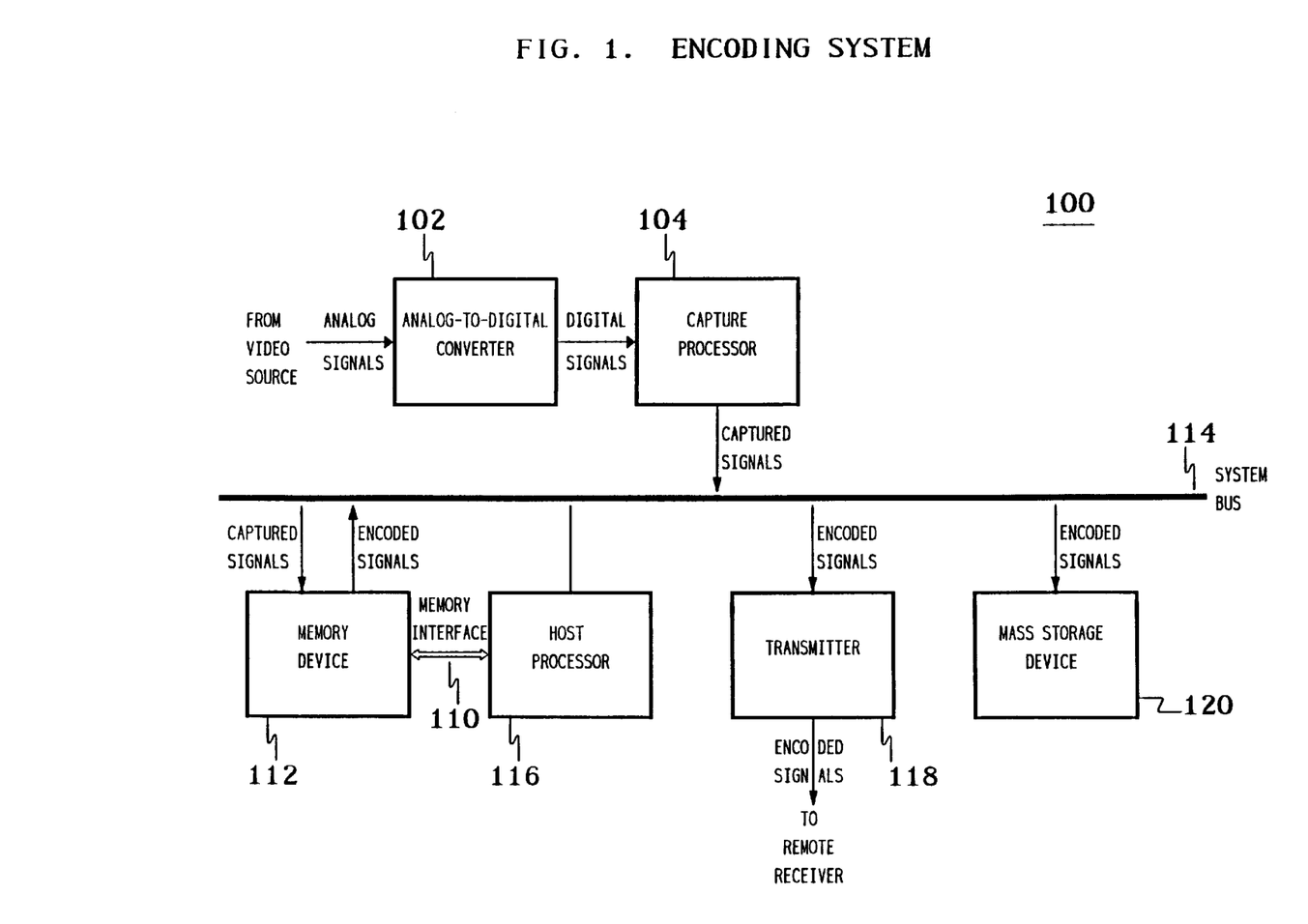
FIG. 1 is a block diagram of a video system for encoding video signals in a PC environment, according to a preferred embodiment of the present invention.

Referring now to FIG. 1, there is shown a computer system 100 for encoding video signals, according to a preferred embodiment of the present invention. Analog-to-digital (A/D) converter 102 of encoding system 100 receives analog video signals from a video source. The video source may be any suitable source of analog video signals such as a video camera or VCR for generating local analog video signals or a video cable or antenna for receiving analog video signals from a remote source. A/D converter 102 decodes (i.e., separates the signal into constituent components) and digitizes the analog video signals into digital video component signals (e.g., in one embodiment, 8-bit R, G, and B component signals).

Capture processor 104 captures the digitized component signals received from converter 102. Capturing may include one or more of color conversion (e.g., RGB to YUV), scaling, and subsampling. Each captured video frame is represented by a set of three two-dimensional component planes, one for each component of the digitized video signals. In one embodiment, capture processor 104 captures video signals in a YUV9 (i.e., YUV 4:1:1) format, in which every (4×4) block of pixels of the Y-component plane corresponds to a single pixel in the U-component plane and a single pixel in the V-component plane. Capture processor 104 selectively stores the captured signals to memory device 112 and/or mass storage device 120 via system bus 114. Those skilled in the art will understand that, for real-time encoding, the captured signals are preferably stored to memory device 112, while for non-real-time encoding, the captured signals are preferably stored to mass storage device 120.

During real-time encoding, host processor 116 reads the captured bitmaps from memory device 112 via high-speed memory interface 110 and generates encoded video signals that represent the captured video signals. Depending upon the particular encoding scheme implemented, host processor 116 applies a sequence of compression steps to reduce the amount of data used to represent in the information in the video signals. The encoded video signals are then stored to memory device 112 via memory interface 110, and/or mass storage device 120 via system bus 114. Host processor 116 may copy the encoded video signals to mass storage device 120 and/or transmit the encoded video signals to transmitter 118 for real-time transmission to a remote receiver (not shown in FIG. 1).

Figure 2:
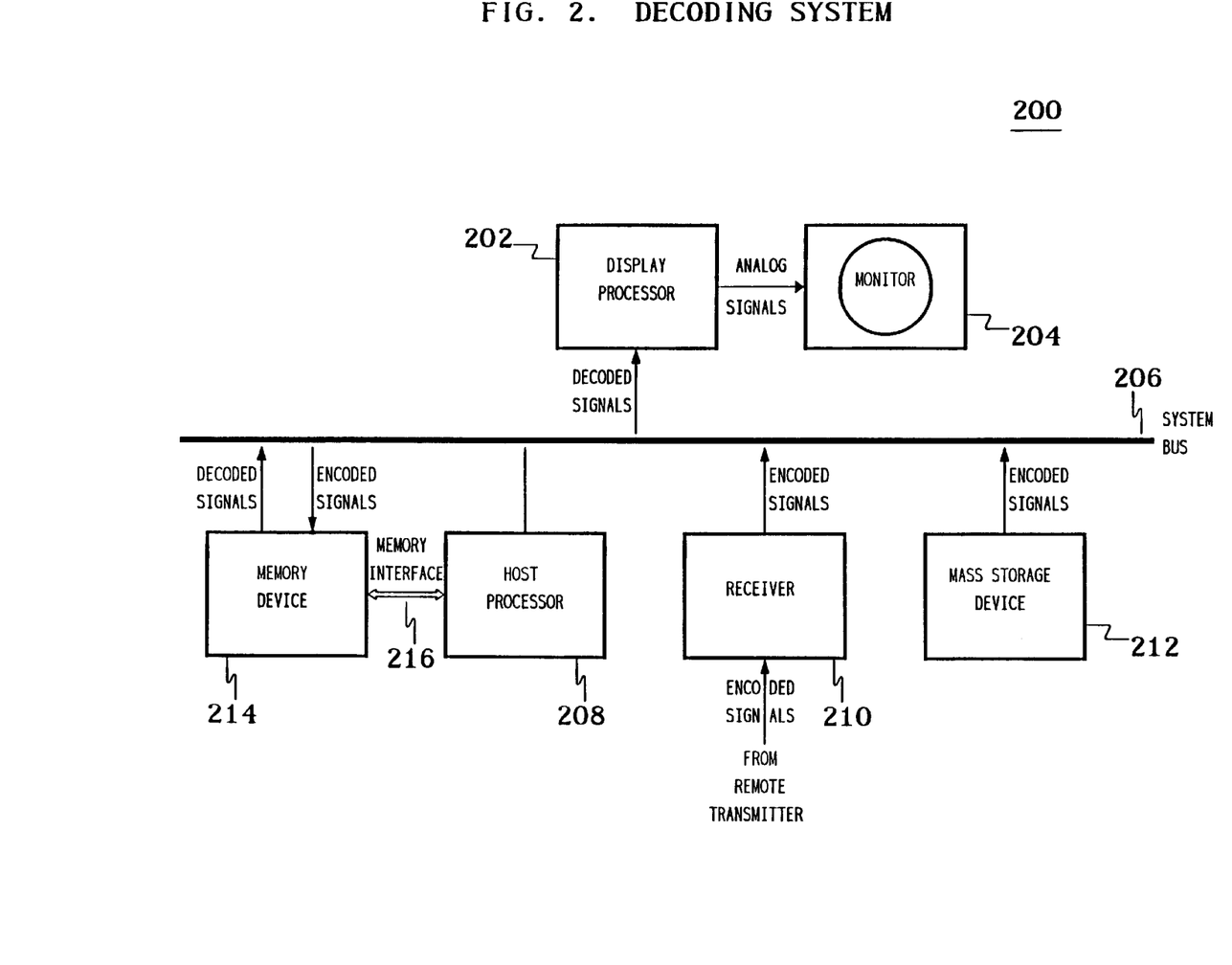
FIG. 2 is a computer system for decoding the video signals encoded by the computer system of FIG. 1, according to a preferred embodiment of the present invention.

Referring now the FIG. 2, there is shown a computer system 200 for decoding the video signals encoded by encoding system 100 of FIG. 1, according to a preferred embodiment of the present invention. Encoded video signals are either read from mass storage device 212 of decoding system 200 or received by receiver 210 from a remote transmitter, such as transmitter 118 of FIG. 1. The encoded video signals are stored to memory device 214 via system bus 206.

Host processor 208 accesses the encoded signals stored in memory device 214 via high-speed memory interface 216 and decodes the encoded video signals for display. Decoding the encoded video signals involves undoing the compression processing implemented by encoding system 100 of Fig. I. Host processor 208 stores the decoded video signals to memory device 214 via memory interface 216 from where they are transmitted to display processor 202 via system bus 206. Alternatively, host processor 208 transmits the decoded video signals directly to display processor 202 via system bus 206. Display processor 202 processes the decoded video signals for display on monitor 204. The processing of display processor 202 includes digital-to-analog conversion of the decoded video signals. After being decoded by host processor 208 but before being D/A converted by display processor 202, the decoded video signals may be upsampled (e.g., from YUV9 to YUV24), scaled, and/or color converted (e.g., from YUV24 to RGB24). Depending upon the particular embodiment, each of these processing steps may be implemented by either host processor 208 or display processor 202.

Referring again to FIG. 1, encoding system 100 is preferably a microprocessor-based personal computer (PC) system with a special purpose video-processing plug-in board. In particular, A/D converter 102 may be any suitable means for decoding and digitizing analog video signals. Capture processor 104 may be any suitable processor for capturing digitized video component signals as subsampled frames. In a preferred embodiment, A/D converter 102 and capture processor 104 are contained in a single plug-in board capable of being added to a microprocessor-based PC system.

Host processor 116 may be any suitable means for controlling the operations of the special-purpose video processing board and for performing video encoding. Host processor 116 is preferably an Intel® general-purpose microprocessor such as an Intel® *i*486™, Pentium™, or higher processor. System bus 114 may be any suitable digital signal transfer device and is preferably a Peripheral Component Interconnect (PCI) bus. Memory device 112 may be any suitable computer memory device and is preferably one or more dynamic random access memory (DRAM) devices. High-speed memory interface 110 may be any suitable means for interfacing between memory device 112 and host processor 116. Mass storage device 120 may be any suitable means for storing digital signals and is preferably a computer hard drive. Transmitter 118 may be any suitable means for transmitting digital signals to a remote receiver. Those skilled in the art will understand that the encoded video signals may be transmitted using any suitable means of transmission such as telephone line, RF antenna, local area network, or wide area network.

Referring again to FIG. 2, decoding system 200 is preferably a microprocessor-based PC system similar to the basic PC system of encoding system 100. In particular, host processor 208 may be any suitable means for decoding encoded video signals and is preferably an Intel® general purpose microprocessor such as an Intel® i486™, Pentium™, or higher processor. System bus 206 may be any suitable digital signal transfer device and is preferably a PCI bus. Mass storage device 212 may be any suitable means for storing digital signals and is preferably a CD-ROM device or a hard drive. Receiver 210 may be any suitable means for receiving the digital signals transmitted by transmitter 118 of encoding system 100. Display processor 202 may be any suitable device for processing video signals for display (including converting the digital video signals to analog video signals) and is preferably implemented through a PC-based display system such as a VGA or SVGA system. Monitor 204 may be any means for displaying analog signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video signals. Those skilled in the art will understand that such a combined system may be used to display decoded video signals in real-time to monitor the capture and encoding of video signals.

In alternative embodiments of present invention, the video encode processing of an encoding system and/or the video decode processing of a decoding system may be assisted by a pixel processor, such as an Intel® i750PE™ processor, or other suitable component(s) to off-load processing from the host processor by performing computationally intensive operations.

Bitrate Damper

Figure 3:
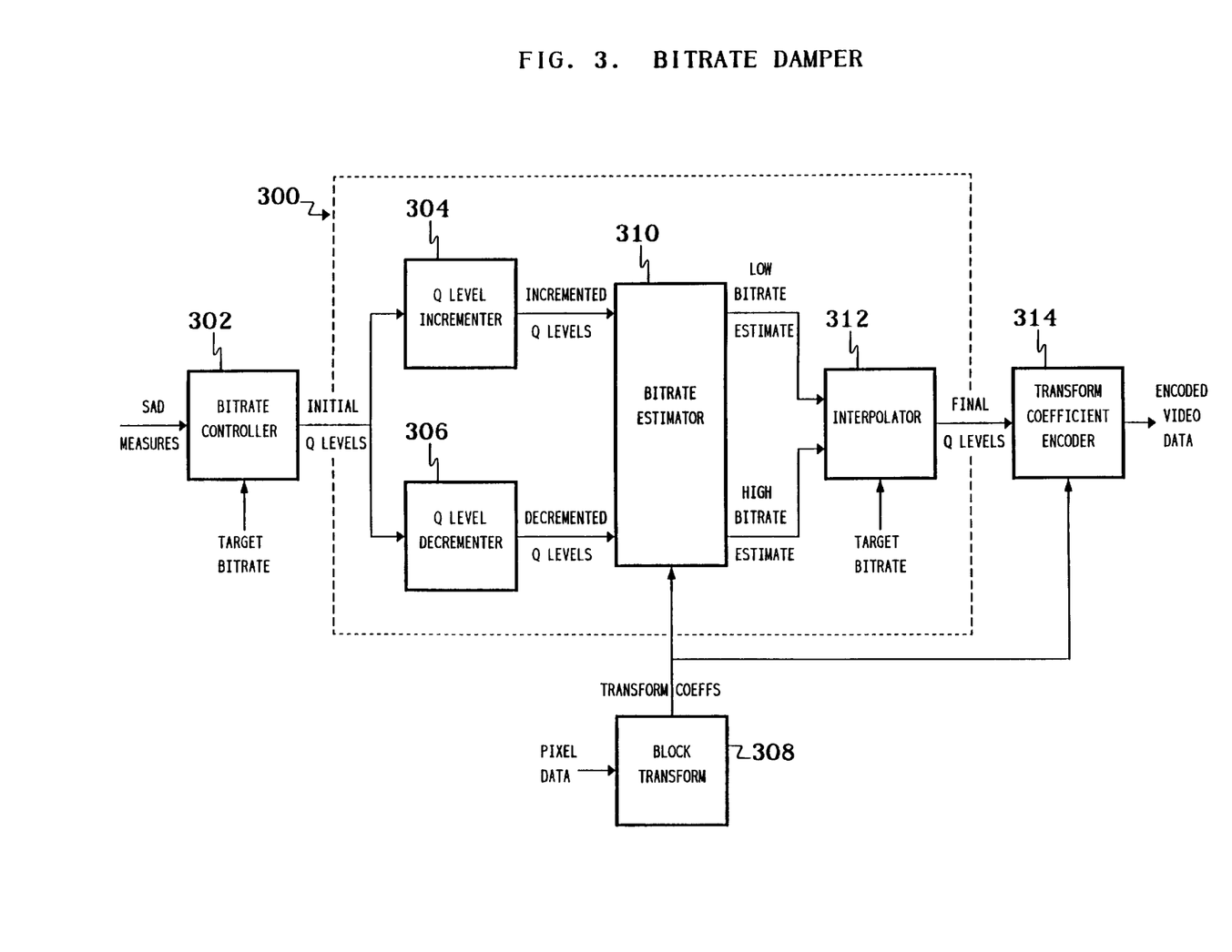
FIG. 3 is a block diagram of the bitrate damper, according to a preferred embodiment of the present invention.
Figure 4:
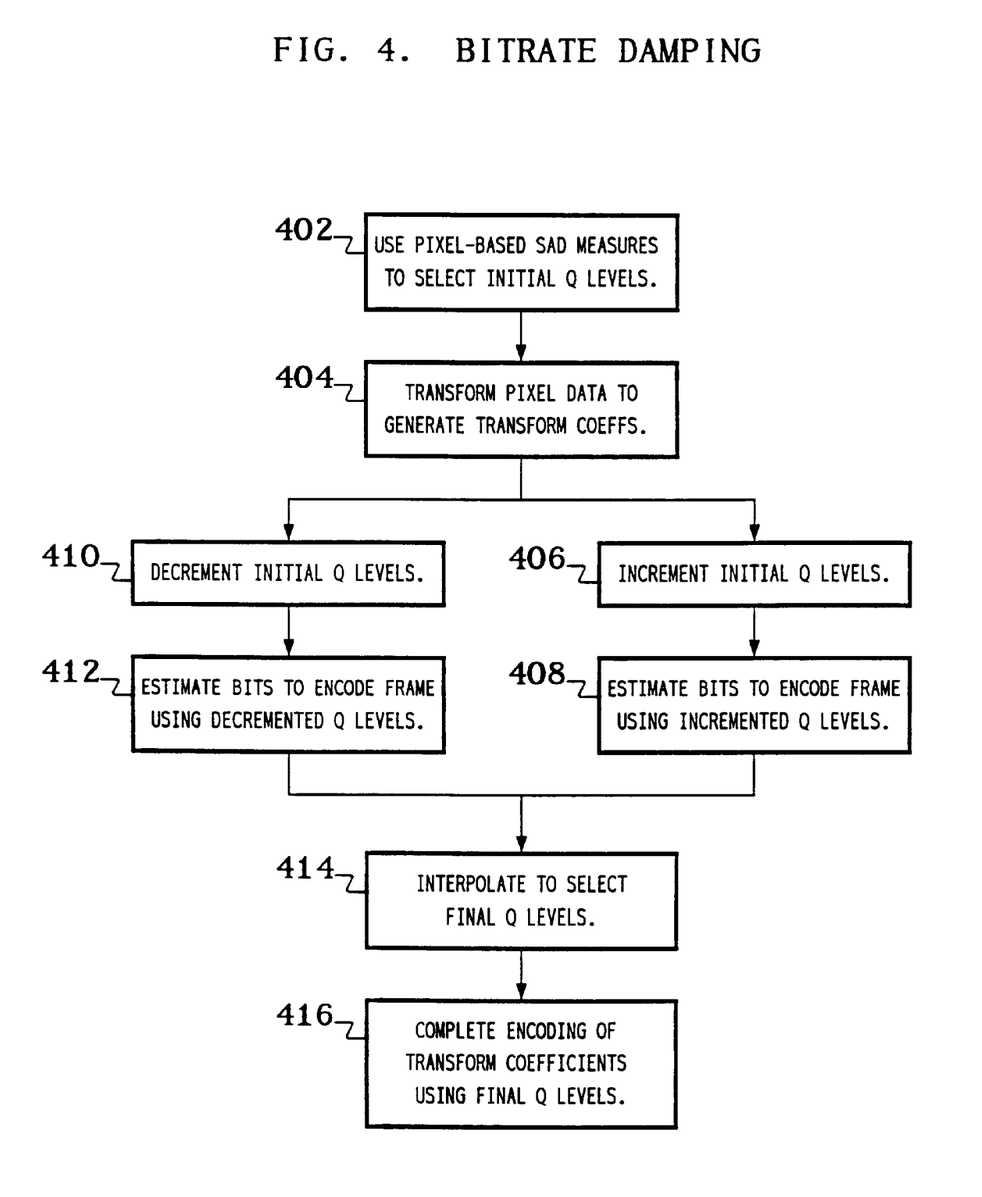
FIG. 4 is a flow chart of the processing implemented by the bitrate damper of FIG. 3.

Referring now to FIGS. 3 and 4, there are shown a block diagram of bitrate damper 300 and a flow chart of the processing implemented by bitrate damper 300, according to a preferred embodiment of the present invention. Bitrate damper 300 adjusts the initial selections of Q levels made by bitrate controller 302 to generate final selections of Q levels to be used by transform coefficient encoder 314 to generate the fully encoded video data from the transform coefficients.

In particular, bitrate controller 302 uses sum-of-absolute-differences measures (or other acceptable statistical measures), along with the target bitrate, to select an initial set of Q levels for encoding the current frame (step 402 of FIG. 4). The SAD measures may be generated during motion estimation and/or block classification processing not shown in FIG. 3. The SAD measures are based either on the pixels themselves for intraframe encoding or on the corresponding (possibly motion-compensated) interframe pixel differences for interframe or predictive encoding. Depending on the video compression algorithm, each frame may have one or more different Q levels. For example, an encoding scheme may permit Q-level selection at macroblock resolution (i.e., each 16×16 region). The initial selection of Q levels may be made by any of the standard techniques that are known to those of ordinary skill in the art. For example, an average Q level may be selected for the current frame based on the average activity (i.e., energy, entropy) of the frame and on the performance of the bitrate controller in controlling the bitrate for encoding the preceding frames. An initial Q level may then be selected for each macroblock, deviating from the average Q level for the frame based on the activity of the macroblock relative to the average activity of the frame. In a preferred embodiment, the initial Q levels are selected to a precision of ⅛ of a Q level.

Block transform 308 of FIG. 3 applies a block transform to the pixel data to generate blocks of transform coefficients (step 404). For real-time applications like video conferencing, the block transform is preferably a fast, relatively accurate transform such as a slant transform, but other transforms such as DCT or Haar transforms may be more appropriate for other applications.

The initial Q levels generated by bitrate controller 302 are passed to both Q-level incrementer 304 and Q-level decrementer 306. Q-level incrementer 304 increments the initial Q level for each block by a specified increment (e.g., +⅛ Q level) (step 406). Bitrate estimator 310 uses the incremented Q levels and the transform coefficients generated by block transform 308 to estimate the number of bits required to encode the current frame using the incremented Q levels (step 408). The processing of bitrate estimator 310 is described in further detail later in this specification in the section entitled "Bitrate Estimator."

Similarly, Q-level decrementer 306 decrements the initial Q level for each block by a specified decrement (e.g., −⅛ Q level) (step 410). Bitrate estimator 310 uses the decremented Q levels and the transform coefficients from block transform 308 to estimate the number of bits required to encode the current frame using the decremented Q levels (step 412). If the initial Q levels selected by bitrate controller 302 are reasonably good, then the estimate generated by bitrate estimator 310 using the incremented Q levels will typically be below the target bitrate and the estimate generated using the decremented Q levels will typically be above the target bitrate.

Interpolator 312 interpolates between the low-bitrate estimate (based on the incremented Q levels) and the high-bitrate estimate (based on the decremented Q levels) to determine Q-level adjustments that need to be made to the initial Q levels to achieve the target bitrate (step 414). Interpolator 312 uses those adjustments to generate a set of the final Q levels for the current frame. If the low-bitrate estimate and the high-bitrate estimate are both either above or below the target bitrate, then interpolator 312 will "extrapolate" from the two estimates to determine the Q-level adjustments. In any case, the final Q levels are selected by rounding the interpolated Q levels having a resolution of ⅛ Q level to the nearest whole number. In a preferred embodiment, the magnitudes of the Q-level adjustments are limited to a maximum of one whole Q level (i.e., ±⅝ Q level) from the initial Q levels. The Q-level adjustments may also be fed forward to the bitrate controller for use in processing the next frame (e.g., in generating initial Q levels for the next frame).

Transform coefficient encoder 314 uses the final Q levels generated by interpolator 312 to complete the encoding process on the transform coefficients generated by block transform 308 (step 416). As described earlier, this encoding process preferably involves quantizing the transform coefficients using the Q tables associated with the selected final Q levels, run-length encoding the quantized coefficients, and variable-length encoding the run-length codes. The output of encoder 314 is the encoded video data for the current frame.

To illustrate the processing of bitrate damper 300, assume that the current frame contains only two macroblocks, A and B. Assume further that bitrate controller 302 assigns Macroblock A an initial Q level of 5⅛ and Macroblock B an initial Q level of 7⅜. Q level incrementer 304 generates incremented Q levels of 5 5/8 for Macroblock A and 8 for Macroblock B. Bitrate estimator 310 generates a low bitrate estimate using the incremented Q levels. Similarly, Q level decrementer 306 generates decremented Q levels of 4⅝ for Macroblock A and 7 for Macroblock B. Bitrate estimator 310 generates a high bitrate estimate using the decremented Q levels. Assume that the low bitrate estimate is 22 Kbytes and the high bitrate estimate is 30 Kbytes. Assume further that the target bitrate is 24 Kbytes. Using these bitrates, interpolator 312 interpolates between the high bitrate estimate $E_{high}$ and the low bitrate estimate $E_{low}$ to generate the Q-level adjustment $Q_{adj}$ to achieve the target bitrate $B_{targ}$, using Equation (1) as follows:

$$Q_{adj} = \frac{E_{high} - B_{targ}}{E_{high} - E_{low}} = \frac{30 \text{ Kbytes} - 24 \text{ Kbytes}}{30 \text{ Kbytes} - 22 \text{ Kbytes}} = \frac{6}{8} \quad (1)$$

The Q-level adjustment $Q_{adj}$ is then added to the decremented Q levels 4⅝ and 7 for Macroblocks A and B, respectively, to get final Q levels of (4⅝+⅝) or 5⅜ for Macroblock A and (7+⅝) or 7⅝ for Macroblock B.

Bitrate Estimator

An important feature of the present invention is the ability to generate an accurate estimate of the number of bits required to encode the current frame at specified Q levels without taking the time to perform the actual encoding. Since, in a preferred encoding scheme, the quantized transform coefficients are run-length encoded, the number of bits contributed to the encoded bitstream by a particular transform coefficient depends not just on the value of that coefficient and its quantizer, but also upon the quantized values of the preceding and subsequent coefficients in the run-length scan pattern. In a preferred embodiment of the present invention, the quantized coefficients are encoded as run-val pairs consisting of a non-zero quantized coefficient value followed by a run of coefficients that quantize to zero. The run-length scan follows a specified scan pattern, such as a zig-zag scan.

There are three possibilities for how a transform coefficient contributes bits to the encoded bitstream. If the coefficient does not quantize to zero, then the zero run as of the previous coefficient in the scan pattern and the quantized value of the current coefficient both become part of the sequence of run-length codes for the block. The zero run is initialized to zero for the next coefficient in the scan pattern. If the coefficient quantizes to zero, then the current zero run is incremented. If the zero quantized coefficient is the last coefficient in the scan pattern, then a special end-of-block code becomes the last run-length code for the current block.

According to a preferred embodiment of the present invention, bitrate estimator 310 of FIG. 3 estimates the number of bits required to encode each block of transform coefficients by summing the number of bits contributed by each of the coefficients based on the specified Q level for that block. Bitrate estimator 310 uses lookup tables to perform its processing quickly.

In one possible embodiment, bitrate estimator 310 uses a single lookup table, which maps each combination of (1) transform coefficient, (2) quantizer, and (3) zero-run to an estimate of the number of bits contributed to the encoded bitstream. Block transform 308 of FIG. 3 is preferably a slant transform that generates an (8×8) block of 14-bit transform coefficients from each block of pixel data. There are preferably 16 different inter Q levels and 16 different intra Q levels. Each Q level is associated with an (8×8) array of quantizers, which preferably have values that range from 1 to 64. In such an embodiment, the indices required for the lookup table operations would each be 26 bits long: 14 bits for the transform coefficient, 6 bits for the quantizer, and 6 bits for the size of the zero run. Such a lookup table would have $2^{26}$ entries and, if each entry were 8-bits long, the resultant 64-megabyte table would be prohibitively large for most, if not all, video encoding applications.

In another possible embodiment, bitrate estimator 310 uses two lookup tables. A first table maps quantizer and transform coefficient to the corresponding quantized coefficient. The quantized coefficient is then combined with the zero run to access a second table that maps to the number of bits contributed to the encoded bitstream. If the index for the first table is composed of the 6-bit quantizers and ten bits for a reduced-precision unquantized transform coefficient, then a 16-bit index could be used to map to an 8-bit quantized coefficient. The 8-bit quantized coefficient would then be combined with the 6-bit zero run to form a 14-bit index for the second table. The two tables of this embodiment would require 80 kilobytes (K) of memory, which may still be prohibitively large for many video encoding applications. For example, in processors having only 8K of on-chip data cache available, 80K worth of lookup tables would not be expected to perform well.

Figure 5:
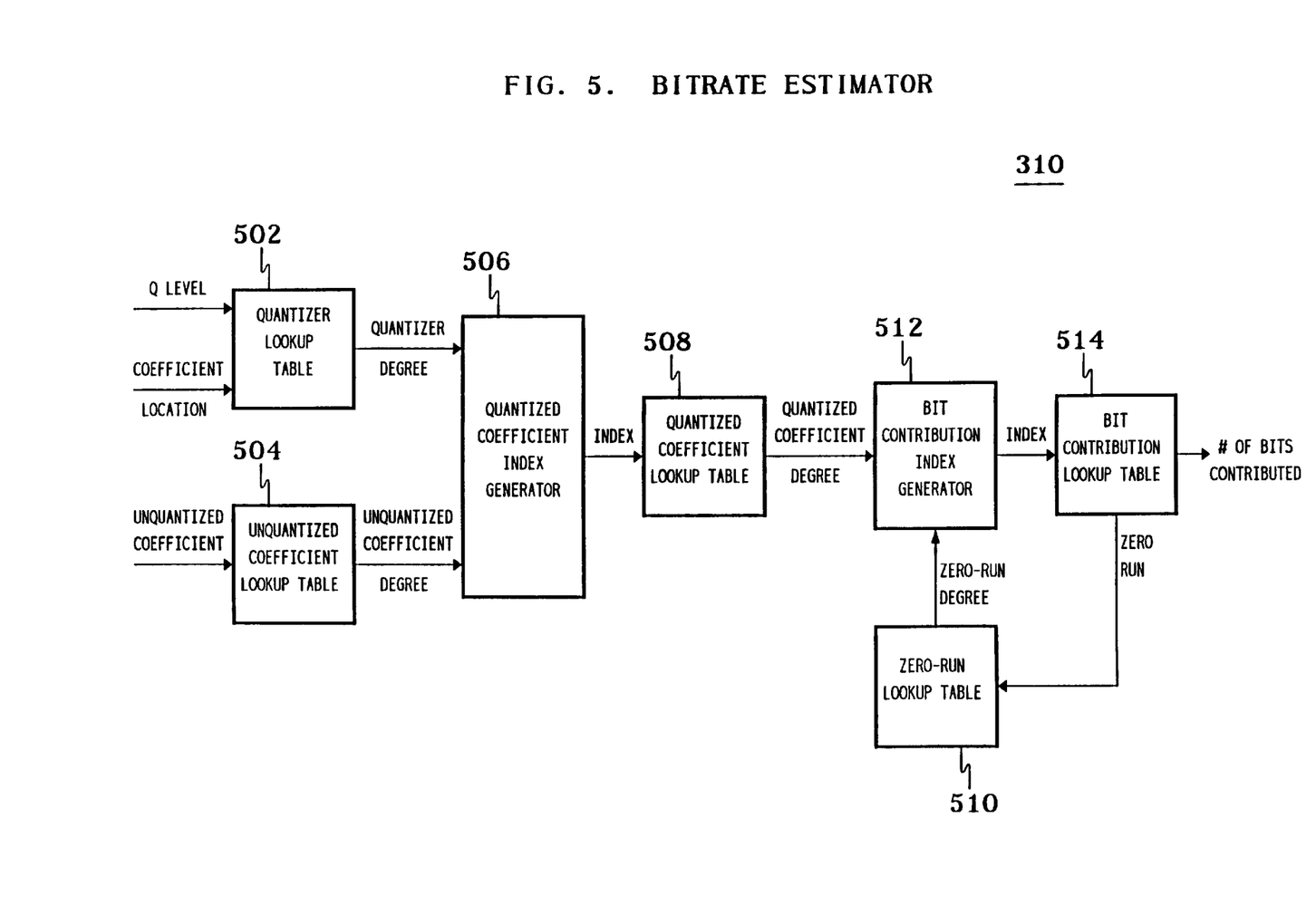
FIG. 5 is a block diagram of the bitrate estimator of FIG. 3.
Figure 6:
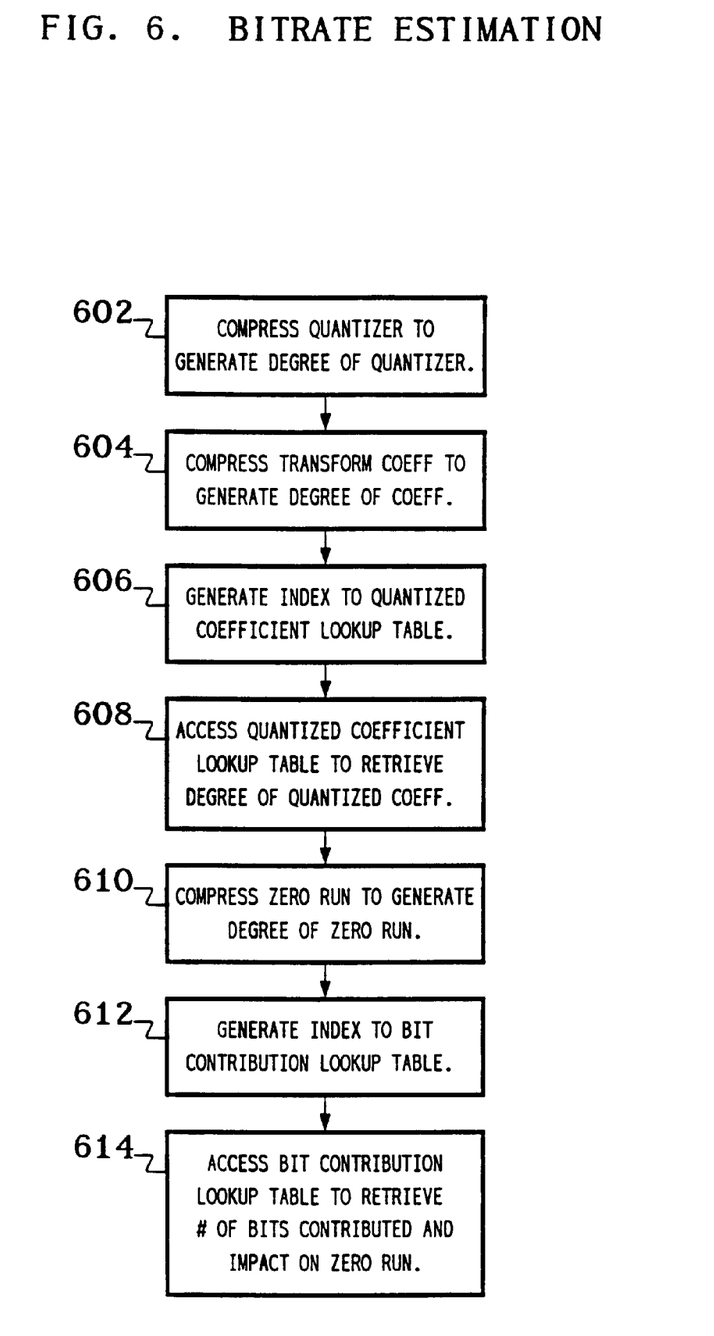
FIG. 6 is a flow diagram of the processing implemented by the bitrate estimator of FIG. 5 to generate an estimate of the number of bits contributed to the encoded bitstream for each transform coefficient.

Referring now to FIGS. 5 and 6, there are shown a block diagram of bitrate estimator 310 of FIG. 3 and a flow diagram of the processing implemented by bitrate estimator 310 to generate an estimate of the number of bits contributed to the encoded bitstream for each transform coefficient, according to a preferred embodiment of the present invention. In this embodiment, bitrate estimator 310 compresses each of the three inputs (quantizer, transform coefficient, and zero run) before using them to generate indices to lookup tables. Each compression step is itself implemented by a lookup table which represents a non-linear mapping from an input to the degree of the input, where the degree of the input is the compressed input.

In particular, quantizer lookup table 502 maps the current Q level and the location of the current transform coefficient to a quantizer degree (step 602 of FIG. 6). In a preferred embodiment, there are 32 different Q levels: 0–15 for inter blocks and 16–31 for intra blocks. Each Q level is associated with an (8×8) array of quantizers, where each quantizer has a value from 1 to 64. Each quantizer meanwhile is associated with a quantizer degree, which represents the compressed quantizer. Each combination of Q level and transform coefficient location corresponds to a specific quantizer, which in turn corresponds to a specific quantizer degree. In a preferred embodiment, the Q-level degree is a 5-bit value that ranges from 0 to 31.

In one possible embodiment, lookup table 502 could be implemented by mapping the current Q level and the current transform coefficient location to the corresponding quantizer using a first lookup table, accessing the 32 quantization tables used by transform coefficient encoder 314 of FIG. 3. The quantizer degree is then derived from the quantizer using a second lookup table, accessing a special table that maps each of the 64 different quantizers to its corresponding quantizer degree.

In an alternative embodiment, lookup table 502 is implemented using a single lookup table using the current Q level and current transform coefficient location as indices. The lookup table for this embodiment is an array of 32 tables—one table for each Q level—where each table contains 64 entries, where each entry is the appropriate quantizer degree. Although this embodiment uses a larger table, it is faster since it used only a single lookup table.

Unquantized coefficient lookup table 504 uses the 14-bit unquantized coefficient as the index into a lookup table to map the unquantized coefficient to the degree of the unquantized coefficient (step 604). In a preferred embodiment, the unquantized coefficient degree is an 8-bit value that ranges from −55 to +160.

Index generator 506 combines the 5-bit Q-level degree and the 8-bit unquantized coefficient degree to generate a 13-bit index (step 606). The 13-bit index is used to access the degree of the corresponding quantized coefficient from quantized coefficient lookup table 508 (step 608). In a preferred embodiment, the quantized coefficient degree ranges is an 5-bit value that ranges from 0 to 19.

Zero-run lookup table 510 compresses the 6-bit zero run to generate the degree of the zero run (step 610). In a preferred embodiment, zero-run lookup table 510 simply clips the zero-run value to a maximum of 31. That is, for a zero run having a value from 0 to 31, the degree of the zero run equals the zero run; while, for a zero run having a value from 32 to 64, the degree of the zero run equals 31. Thus, zero-run degree is a 5-bit value that ranges from 0 to 31. Those skilled in the art will understand that zero runs greater than 31 typically quantize to about the same number of bits as a zero run of 31.

Index generator 512 combines the 5-bit quantized coefficient degree from lookup table 508 and the 5-bit zero-run degree to generate a 10-bit index (step 612). The 10-bit index is used to access an 8-bit entry from bit contribution lookup table 514 (step 614). The 8-bit entry identifies the number of bits contributed to the encoded bitstream and also indicates whether to increment or initialize the zero run to be used for the next transform coefficient.

In a preferred embodiment, in which all of the compression steps of performed using lookup tables, the combined size of the lookup tables totals about 32K. Although this is larger than the 8K on-chip data cache of an Intel® Pentium™ processor, nevertheless, since there are small areas of the tables that are used relatively frequently and large areas that are used relatively infrequently, the table areas can be arranged to assure a high hit rate on the on-chip cache. Those skilled in the art will understand that this improves processing speed by reducing the number of times in which access must be made to the complete tables stored in off-chip memory.

Figure 7:
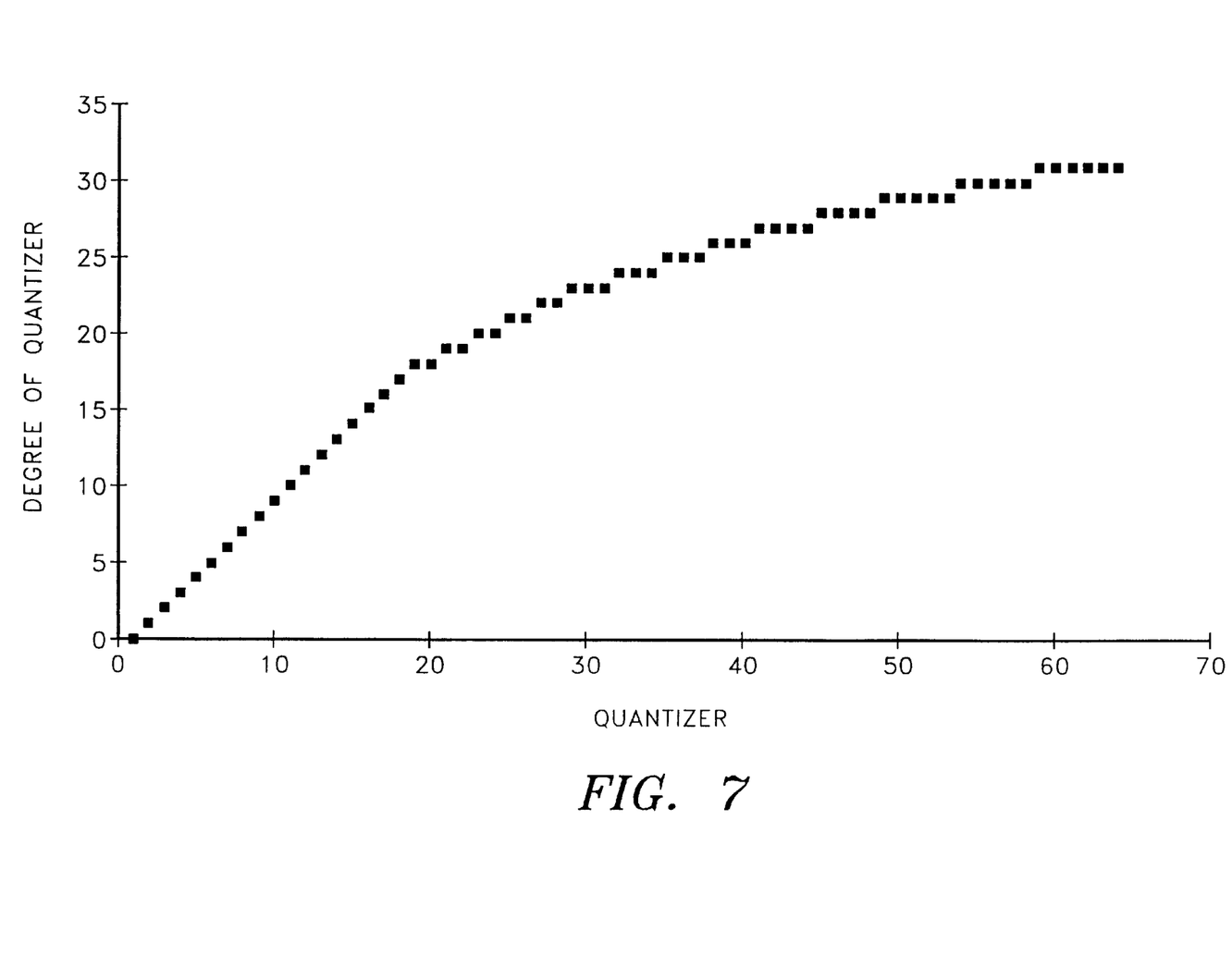
FIG. 7 is a graphical representation of the mapping performed by the Q-level compressor of FIG. 5 from Q level to the degree of Q level.

Referring now to FIG. 7, there is shown a graphical representation of the mapping performed by quantizer lookup table 502 of FIG. 5 from the quantizer (X axis) to the degree of the quantizer (Y axis). Lookup table 502 maps each of the possible quantizers (from 1 to 64) to a corresponding quantizer degree (from 0 to 30). As shown in FIG. 7, the non-linear mapping preserves the differences between small quantizers while compressing the differences between large quantizers.

Figure 8:
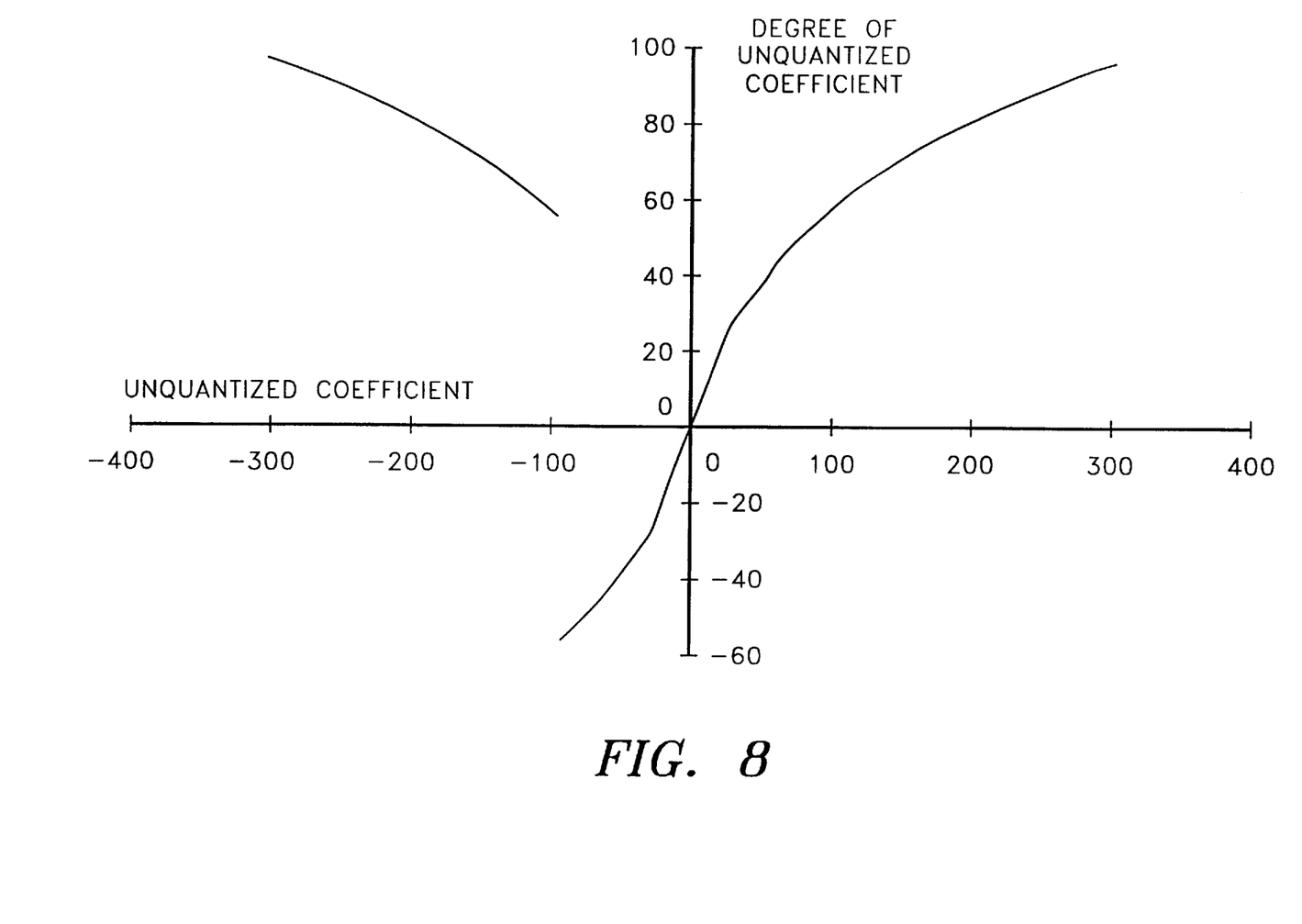
FIG. 8 is a graphical representation of the mapping performed by the coefficient compressor of FIG. 5 from unquantized transform coefficient to the degree of unquantized transform coefficient.

Referring now to FIG. 8, there is shown a graphical representation of the center portion of the mapping performed by unquantized coefficient lookup table 504 from 14-bit unquantized transform coefficient (X axis) to the 8-bit degree of unquantized transform coefficient (Y axis). The mapping of FIG. 8 maps each of the 16K different unquantized coefficients (i.e., from −8K to +8K) to one of 216 different values (i.e., from −55 to +160) corresponding to the degree of the unquantized coefficient. The number of different values for the degree of the unquantized coefficient was selected to achieve efficient use of the on-chip cache for storing the quantized coefficient lookup table 508 with minimal or no conflict with zero-run lookup table 510 and bit contribution lookup table 514. The mapping itself was generated based on the particular Huffman codebook used in the video encoding process. In general, the goal in generating a mapping from the unquantized coefficient to the degree of the unquantized coefficient is to provide relatively high resolution (i.e., sensitivity) for ranges of unquantized coefficients where small changes in unquantized coefficient imply different numbers of bits contributed to the bitstream and relatively low resolution for ranges of unquantized coefficients where the number of bits contributed to the bitstream is less sensitive to small changes in unquantized coefficient. For a typical preferred Huffman codebook, the larger the magnitude of the unquantized coefficient, the less sensitive is the number of bits contributed to the bitstream to changes in unquantized coefficient. Moreover, large positive unquantized coefficients contribute roughly the same number of bits to the bitstream as large unquantized coefficients of the same magnitude. The mapping of FIG. 8 attempts to exploit these characteristics.

Figure 9:
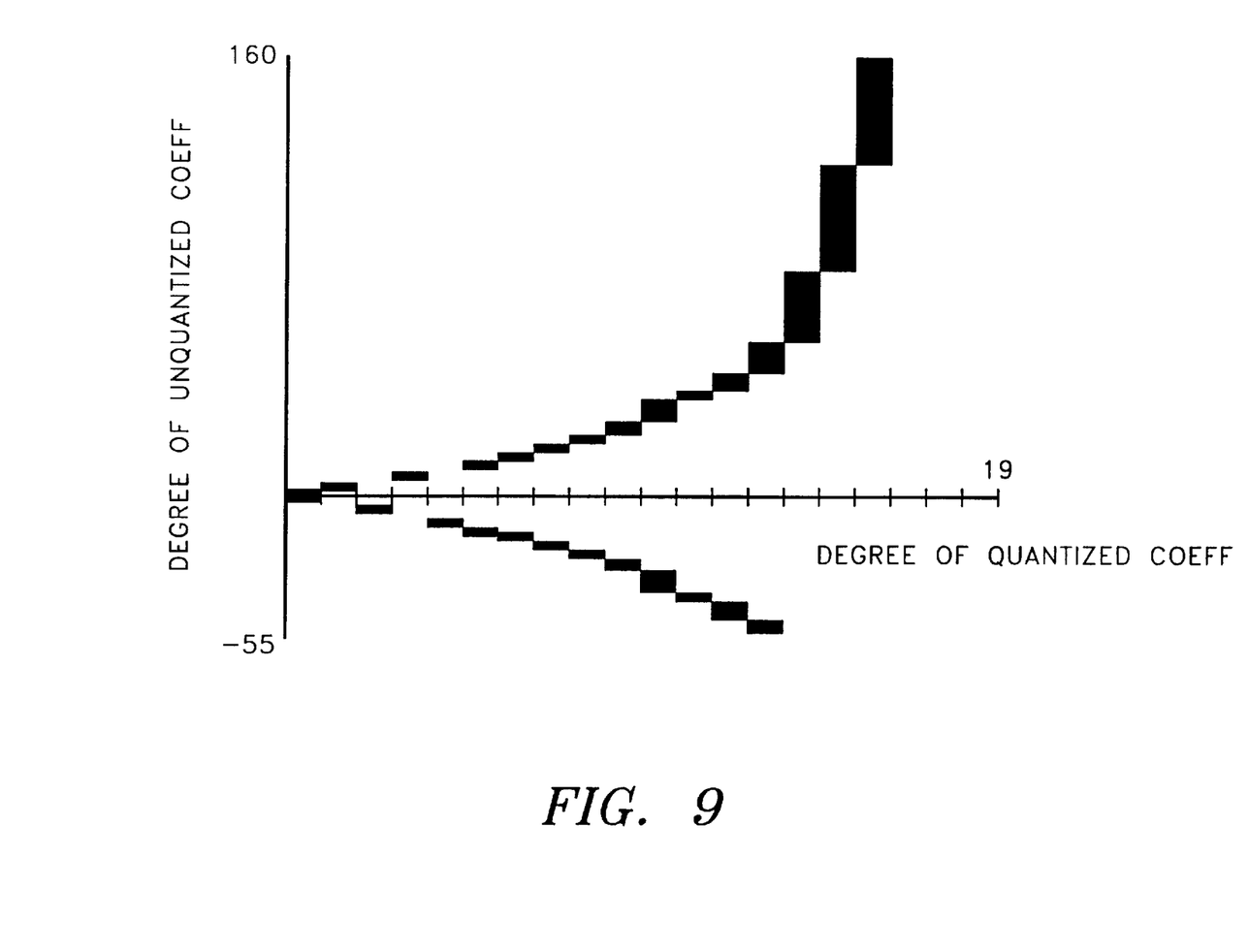
FIG. 9 is a graphical representation of the mapping performed using the quantized coefficient lookup table of FIG. 5 from the degree of unquantized coefficient to the degree of quantized coefficient for a specific degree of Q level.

Referring now to FIG. 9, there is shown a graphical representation of the mapping of quantized coefficient lookup table 508 from the degree of unquantized coefficient (Y axis) to the degree of quantized coefficient (X axis) for a specific quantizer degree. For each possible quantizer degree (i.e., from 0 to 30), lookup table 508 maps each of the degrees of unquantized coefficient (from −55 to 160) to a corresponding degree of quantized coefficient (from 0 to 19).

As described earlier, bitrate estimator 310 is designed to estimate the number of bits contributed to the bitstream for each input (i.e., each unquantized coefficient) for a given Q level in the context of the current run of zero quantized coefficients. Bitrate estimator 310 provides such an estimate without actually performing the encoding process and without using a single lookup table that maps from each possible combination of unquantized coefficient, Q level, and zero run to the number of bits contributed. Such a single lookup table would be prohibitively large given the cache size of the preferred Intel® Pentium™ processor. One alternative would be simply to reduce the number of bits for each input by truncating the values. This however does not provide accurate estimates of bitrate because it assumes constant sensitivity of numbers of bits contributed to the bitstream over the range of each input. Bitrate estimator 310 provides more accurate estimates by mapping each input to an output (i.e., degree) using a mapping that preserves resolution where it is important and reduces resolution where it is not important, where important means that small differences in input result in different outputs.

The present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for encoding images, comprising the steps of:
   (a) transforming image signals corresponding to a current image to generate transform coefficients for the image signals, and generating an initial set of quantization (Q) levels for the current image from the image signals in accordance with a target bitrate;
   (b) selecting a first set of one or more Q levels for the current image by incrementing the initial set of Q levels;
   (c) generating a first estimated bitrate for encoding the transform coefficients using the first set of Q levels;
   (d) selecting a second set of one or more Q levels for the current image by decrementing the initial set of Q levels;
   (e) generating a second estimated bitrate for encoding the transform coefficients using the second set of Q levels;
   (f) generating one or more Q-level adjustments by interpolating between the first estimated bitrate and the second estimated bitrate to achieve the target bitrate only when the first estimated bitrate and the second estimated bitrate bound the target bitrate;
   (g) generating a final set of Q levels by adjusting the initial set of Q levels using the Q-level adjustments; and
   (h) encoding transform coefficients corresponding to the current image using the final set of Q levels.

2. The process of claim 1, wherein:
   the image signals comprise at least one of pixels and pixel differences;
   step (a) comprises the step of transforming the image signals using a slant transform; and
   step (h) comprises the step of quantizing the transform coefficients of step (h) using the final set Q levels.

3. The process of claim 1, wherein the initial set of Q levels are generated based on one or more statistical measures of the image signals.

4. The process of claim 1, wherein step (c) comprises the step of accessing one or more lookup tables using one or more indices generated from the transform coefficients and the first set of Q levels to generate the first estimated bitrate.

5. The process of claim 4, wherein step (c) comprises the steps of:
   (1) mapping each of the transform coefficients to a degree of transform coefficient, wherein each of the transform coefficients has a location;
   (2) mapping each of the Q levels and the location of each of the transform coefficients to a degree of quantizer;
   (3) generating an index from the degree of transform coefficient and the degree of quantizer; and
   (4) accessing a lookup table using the index to generate the first estimated bitrate.

6. The process of claim 5, wherein:
   the mapping of step (c)(1) is a non-linear mapping;
   the mapping of step (c)(2) is a non-linear mapping;
   step (c)(3) comprises the step of generating a quantized coefficient index from the degree of transform coefficient and the degree of quantizer; and
   step (c)(4) comprises the steps of:
      (A) accessing a quantized coefficient lookup table using the quantized coefficient index to generate a degree of quantized coefficient;
      (B) mapping a zero run to a degree of zero run using a non-linear mapping;
      (C) generating a bit contribution index from the degree of quantized coefficient and the degree of zero run; and
      (D) accessing a bit contribution lookup table using the bit contribution index to generate a number of encoded-bitstream bits contributed by a transform coefficient.

7. The process of claim 6, further comprising the step of generating an initial set of Q levels for the current image based on one or more statistical measures of the image signals, wherein:
   the image signals comprise at least one of pixels and pixel differences;
   step (a) comprises the step of transforming the image signals using a slant transform;
   step (b) comprises the step of selecting the first set of Q levels by incrementing the initial set of Q levels;
   step (d) comprises the step of selecting the second set of Q levels by decrementing the initial set of Q levels;
   step (f) comprises the step of interpolating using the first estimated bitrate and the second estimated bitrate to select the Q-level adjustments to achieve the target bitrate; and
   step (h) comprises the step of quantizing the transform coefficients of step (h) using the final set Q levels.

8. An apparatus for encoding images, comprising:
   (a) means for transforming image signals corresponding to a current image to generate transform coefficients for the image signals, and means for generating an initial set of Q levels for the current image from the image signals in accordance with a target bitrate;
   (b) means for selecting a first set of one or more Q levels for the current image by incrementing the initial set of Q levels;
   (c) means for generating a first estimated bitrate for encoding the transform coefficients using the first set of Q levels;
   (d) means for selecting a second set of one or more Q levels for the current image by decrementing the initial set of Q levels;
   (e) means for generating a second estimated bitrate for encoding the transform coefficients using the second set of Q levels;
   (f) means for generating one or more Q-level adjustments by interpolating between the first estimated bitrate and the second estimated bitrate to achieve the target bitrate only when the first estimated bitrate and the second estimated bitrate bound the target bitrate;

(g) means for generating a final set of Q levels by adjusting the initial set of Q level using the Q-level adjustments; and (h) means for encoding transform coefficients corresponding to the current image using the final set of Q levels.

9. The apparatus of claim 8, wherein:

the image signals comprise at least one of pixels and pixel differences;

means (a) transforms the image signals using a slant transform; and means (h) quantizes the transform coefficients of means (h) using the final set Q levels.

10. The apparatus of claim 8, wherein the initial set of Q levels are generated based on one or more statistical measures of the image signals.

11. The apparatus of claim 8, wherein means (c) accesses one or more lookup tables using one or more indices generated from the transform coefficients and the first set of Q levels to generate the first estimated bitrate.

12. The apparatus of claim 11, wherein means (c):

(1) maps each of the transform coefficients to a degree of transform coefficient, wherein each of the transform coefficients has a location;

(2) maps each of the Q levels and the location of each of the transform coefficients to a degree of quantizer;

(3) generates an index from the degree of transform coefficient and the degree of quantizer; and (4) accesses a lookup table using the index to generate the first estimated bitrate.

13. The apparatus of claim 12, wherein:

the mapping of means (c)(1) is a non-linear mapping;

the mapping of means (c)(2) is a non-linear mapping;

means (c)(3) generates a quantized coefficient index from the degree of transform coefficient and the degree of quantizer; and means (c)(4):

(A) accesses a quantized coefficient lookup table using the quantized coefficient index to generate a degree of quantized coefficient;

(B) maps a zero run to a degree of zero run using a non-linear mapping;

(C) generates a bit contribution index from the degree of quantized coefficient and the degree of zero run; and (D) accesses a bit contribution lookup table using the bit contribution index to generate a number of encoded-bitstream bits contributed by a transform coefficient.

14. The apparatus of claim 13, further comprising means for generating an initial set of Q levels for the current image based on one or more statistical measures of the image signals, wherein:

the image signals comprise at least one of pixels and pixel differences;

means (a) transforms the image signals using a slant transform;

means (b) selects the first set of Q levels by incrementing the initial set of Q levels;

means (d) selects the second set of Q levels by decrementing the initial set of Q levels;

means (f) interpolates using the first estimated bitrate and the second estimated bitrate to select the Q-level adjustments to achieve the target bitrate; and means (h) quantizes the transform coefficients of means (h) using the final set Q levels.

15. A storage medium having stored thereon a plurality of instructions for encoding images, wherein the plurality of instructions, when executed by a processor, cause the processor to perform the steps of:

(a) transforming image signals corresponding to a current image to generate transform coefficients for the image signals, and generating an initial set of Q levels for the current image from the image signals in accordance with a target bitrate;

(b) selecting a first set of one or more Q levels for the current image by incrementing the initial set of Q levels;

(c) generating a first estimated bitrate for encoding the transform coefficients using the first set of Q levels;

(d) selecting a second set of one or more Q levels for the current image by decrementing the initial set of Q levels;

(e) generating a second estimated bitrate for encoding the transform coefficients using the second set of Q levels;

(f) generating one or more Q-level adjustments by interpolating between the first estimated bitrate and the second estimated bitrate to achieve the target bitrate only when the first estimated bitrate and the second estimated bitrate bound the target bitrate;

(g) generating a final set of Q levels by adjusting the initial set of Q levels using the Q-level adjustments; and (h) encoding transform coefficients corresponding to the current image using the final set of Q levels.

16. The storage medium of claim 15, wherein:

the image signals comprise at least one of pixels and pixel differences;

step (a) comprises the step of transforming the image signals using a slant transform; and step (h) comprises the step of quantizing the transform coefficients of step (h) using the final Q levels.

17. The storage medium of claim 15, wherein the initial set of Q levels are generated based on one or more statistical measures of the image signals.

18. The storage medium of claim 15, wherein step (c) comprises the step of accessing one or more lookup tables using one or more indices generated from the transform coefficients and the first set of Q levels to generate the first estimated bitrate.

19. The storage medium of claim 18, wherein see (c) comprises the steps of:

(1) mapping each of the transform coefficients to a degree of transform coefficient, wherein each of the transform coefficients has a location;

(2) mapping each of the Q levels and the location of each of the transform coefficients to a degree of quantizer;

(3) generating an index from the degree of transform coefficient and the degree of quantizer; and (4) accessing a lookup table using the index to generate the first estimated bitrate.

20. The storage medium of claim 19, wherein:

the mapping of step (c)(1) is a non-linear mapping;

the mapping of step (c)(2) is a non-linear mapping;

step (c)(3) comprises the step of generating a quantized coefficient index from the degree of transform coefficient and the degree of quantizer; and step (c)(4) comprises the steps of:

(A) accessing a quantized coefficient lookup table using the quantized coefficient index to generate a degree of quantized coefficient;

(B) mapping a zero run to a degree of zero run using a non-linear mapping;

(C) generating a bit contribution index from the degree of quantized coefficient and the degree of zero run; and (D) accessing a bit contribution lookup table using the bit contribution index to generate a number of encoded-bitstream bits contributed by a transform coefficient.

21. The storage medium of claim 20, further comprising means for causing the computer to generate an initial set of Q levels for the current image based on one or more statistical measures of the image signals, wherein:

the image signals comprise at least one of pixels and pixel differences;

step (a) comprises the step of transforming the image signals using a slant transform;

step (b) comprises the step of selecting the first set of Q levels by incrementing the initial set of Q levels;

step (d) comprises the step of selecting the second set of Q levels by decrementing the initial set of Q levels;

step (f) comprises the step of interpolating using the first estimated bitrate and the second estimated bitrate to select the Q-level adjustments to achieve the target bitrate; and step (h) comprises the step of quantizing the transform coefficients of step (h) using the final set Q levels.

22. A computer-implemented process for encoding images, comprising the steps of:

(a) transforming image signals corresponding to a current image to generate transform coefficients for the image signals and generating an initial set of quantization (Q) levels for the current image from the image signals;

(b) selecting a first set of one or more Q levels for the current image by incrementing the initial set of Q levels;

(c) generating a first estimated bitrate for encoding the transform coefficients using the first set of Q levels, comprising the steps of:

(1) mapping each of the transform coefficients to a degree of transform coefficient, wherein each of the transform coefficients has a location;

(2) mapping each of the Q levels and the location of each of the transform coefficients to a degree of quantizer;

(3) generating an index from the degree of transform coefficient and the degree of quantizer; and (4) accessing a lookup table using the index to generate thee first estimated bitrate;

(d) selecting a second set of one or more Q levels for the current image by decrementing the initial set of Q levels;

(e) generating a second estimated bitrate for encoding the transform coefficients using the second set of Q levels;

(f) generating one or more Q-level adjustments from the first estimated bitrate, the second estimated bitrate, and the target bitrate;

(g) encoding transform coefficients based on the Q-level adjustments.

* * * * *